Dec. 17, 1940.   P. E. YOUNG   2,225,395
EXHALATION VALVE FOR GAS MASKS
Filed June 26, 1940
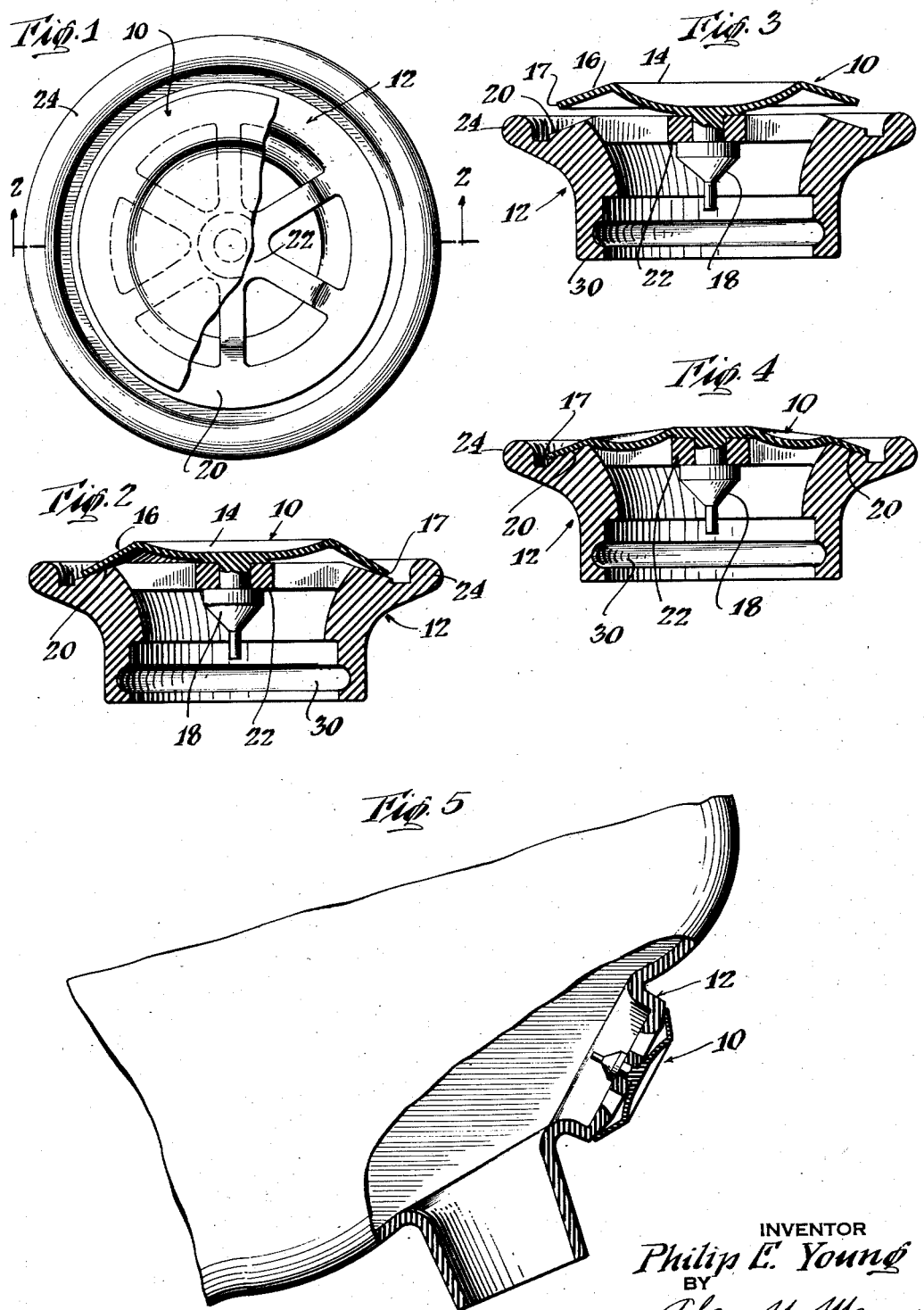
INVENTOR
Philip E. Young
BY
Alan M. Mann
ATTORNEY Patented Dec. 17, 1940

2,225,395

UNITED STATES PATENT OFFICE 2,225,395

EXHALATION VALVE FOR GAS MASKS

Philip E. Young, Fairhaven, Mass., assignor to Acushnett Process Company, a corporation of Massachusetts Application June 26, 1940, Serial No. 342,581

2 Claims. (Cl. 128—141)

This invention relates to an exhalation valve member for gas masks and similar structures and is a continuation-in-part of my application filed on April 28, 1939, under Serial No. 270,492.

Great difficulty has been experienced in providing an exhalation valve which will respond, under conditions of use, to the slightest variation of pressure or suction and yet maintain a seal when closed under atmospheric pressure.

I have discovered that I can meet this problem by utilizing an angular differential between the bearing and seating surfaces of the valve. By disposing the bearing and seating surfaces at an angle I obtain a type of line contact at the point of intersection and I find that this contact provides minimum resistance to the varying pressures of exhalation and permits the structure to respond to variations in pressure or suction relative to the quantum of pressure or suction exerted through the valve. Furthermore, under suction of inhalation the line contact between the two surfaces spreads into surface to surface contact, providing a tight seal.

Broadly speaking, the structure of my invention consists of two members: a tubular member having a seating surface and a closing disk having a bearing surface, the periphery of the closing disk normally resting in line contact on the seating surface of the tubular member. The seating surface on the tubular member is annular and is inclined slightly to a plane perpendicular to the longitudinal axis of the member. The closing disk is held centrally in the tubular member under the tension of elasticity; the tension at the center of the disk being sufficient to maintain the angular differential between the bearing and seating surfaces at the periphery of the structure.

In the preferred embodiment of my invention, contact between the bearing surface and the seating surface occurs at the periphery of the closing disk. Except for this contact, the bearing and seating surfaces are disposed at an angle to each other when the valve is in closed position under atmospheric pressure.

I have said that the closing disk is held on the tubular member by means of elastic tension at the center of the disk. The closing disk is a flexible (and preferably elastic) body, of rubber or the like, and tension exerted at the center of the disk diminishes progressively towards the periphery of the disk. Consequently, the disk can be held firmly in position on the tubular member under tension and yet it is possible to have the periphery of the disk held under sufficient tension so that it is responsive to the slightest variations in pressure or suction. In other words, the tension at the center should be sufficient to keep the periphery of the disk in position on the seating surface, but should not be so great as to destroy the angular differential between the bearing and seating surfaces.

The seating surface is formed at the end of the tubular member forming the base of the valve. This surface is disposed at an angle to a plane perpendicular to the longitudinal axis of the tubular member so as to lock the disk in position under suction of inhalation. Suction tends to deform inwardly the exposed portions of the disk. Under suction of inhalation the disk tends to contract and the disk itself, as an elastic body, also exerts an inward transverse tension. If the seating surface is inclined relative to the longitudinal axis of the tubular member so that the seating surface is bevelled, contraction of the disk inwardly under tension locks the closing disk firmly in its seat and provides a tight seal.

Under pressure of exhalation the periphery of the disk is readily forced away from the seating surface and this action is always relative to the quantum of pressure exerted against the disk. An opening is formed, under pressure of exhalation, which varies in size relative to variations in the pressure. On the other hand, under suction of inhalation the contact between the closing disk and the seating surface on the tubular member spreads to substantial surface to surface contact relative to the increase in suction.

The tubular member carrying the seating surface can be made from a number of materials, preferably plastic substances such as rubber, synthetic rubber, synthetic resins, cellulose acetate, cellulose derivatives and the like. Metal may also be used if properly finished as for example by chromium plating. One of the virtues of a valve of this type is that the tubular member (for example, when molded of a plastic) can be made integral with the face piece of the gas mask itself and in such case the tubular member will be formed of the same material as the face piece.

The structure of my invention is illustrated in the accompanying drawing:

Fig. 1 is a top plan view with part of the closing disk broken away;

Fig. 2 is a vertical section taken on the line 2—2 of Fig. 1 showing the valve in normal closed position under atmospheric pressure;

Fig. 3 is a similar vertical section showing the valve in open position under pressure of exhalation;

Fig. 4 is a similar vertical section showing the valve in closed position under suction of inhalation; and Fig. 5 is a section of a portion of the face piece of a gas mask showing the valve molded integrally with the face piece.

The valve structure of my invention consists of a closing disk 10 and tubular member 12. The closing disk 10 is of an inverted saucer-like configuration and has a flat center portion 14 and an outer downwardly depending skirt portion 16 terminating in a periphery 17. The closing disk 10 is held in the tubular member 12 by means of a stem 18.

The tubular member 12 is formed with a bevelled seating surface 20 and carries a bridge 22 having an orifice to receive the stem 18 of the closing disk. An outer annular flange 24 may be formed on the tubular member 12 adjacent the seating surface.

The exhalation valve is affixed to the gas mask proper by means of ridges 30 or similar means; or is formed integrally with the face piece 34 (as shown in Fig. 5).

In Fig. 2 the valve structure is shown in normally closed position under atmospheric pressure. It is to be noted that the periphery 17 of the closing disk bears on the seating surface 20 in line contact; and that this line contact is obtained by having the bearing surface of the closing disk held at an angular differential with respect to the seating surface 20. It should also be noted that elastic tension, exerted centrally by locking the stem 18 in the bridge member 22, is sufficient to hold the closing disk in position on the seating surface in line contact.

In Fig. 3 the valve structure is shown in open position under pressure of exhalation. Owing to the elastic tension exerted centrally against the closing disk the opening between the closing disk and the seating surface on the tubular member is always relative to the quantum of pressure exerted against the exposed surface of the closing disk. Within limits, the greater the pressure of exhalation the greater the opening.

In Fig. 4 the valve structure is shown in closed position under suction of inhalation. It should be noted that under suction of inhalation the diameter of the closing disk, as shown, is initially extended to the outer portion of the seating surface 20 (see Fig. 4). Immediately the closing disk assumes this extended position on the seating surface 20 continued application of suction tends to contract the diameter of the closing disk and, owing to the bevelled seating surface, the disk is locked in position on the tubular member under inward transverse tension and the valve is tightly sealed.

What I claim is:

1. An exhalation valve for gas masks comprising a tubular member carrying a convex seating surface, a closing disk of elastic material having a peripheral portion shaped to cooperate with said convex seating surface, such peripheral portion having a bearing surface which in normally closed position under atmospheric pressure contacts the convex seating surface on the tubular member in line contact to close the valve, the remaining portions of the bearing and seating surfaces being disposed at an angular differential in normally closed position, means for exerting tension centrally against the closing disk to hold the disk in position on the tubular member, said tension being sufficient to maintain the periphery of the disk in line contact with the seating surface of the tubular member under normal atmospheric pressure, substantial portions of the closing disk being exposed to pressure and suction exerted through the valve so that the disk moves in response to pressure and suction.

2. An exhalation valve for gas masks consisting of an elastic body comprising a tubular member and an inverted saucer-like closing disk mounted on the tubular member, a seating surface on the tubular member inclined slightly to a plane perpendicular to the longitudinal axis of the tubular member, a bearing surface on the closing disk comprising an outer annular depending circular portion thereof, the periphery of which contacts the seating surface of the tubular member in line contact, the remaining portion of the outer annular depending skirt portion being held in spaced realtion from the corresponding portions of the seating surface on the tubular member so that there is a slight angular differential between these surfaces, means for exerting tension centrally against the closing disk to hold the disk in position on the tubular member, said tension being sufficient to maintain the periphery of the closing disk in line contact with the seating surface of the tubular member under normal atmospheric pressure, substantial portions of the closing disk being exposed to pressure and suction exerted through the valve so that the closing disk can move in response to pressure and suction.

PHILIP E. YOUNG.

CERTIFICATE OF CORRECTION.

Patent No. 2,225,395. December 17, 1940.

PHILIP E. YOUNG.

It is hereby certified that error appears in the above numbered patent requiring correction as follows: In the grant, lines 2 and 13, and in the heading to the printed specification, line 4, name of assignee, for "Acushnett Process Company" read --Acushnet Process Company--; page 2, second column, line 39, claim 2, for "realtion" read --relation--; and that the said Letters Patent should be read with this correction therein that the same may conform to the record of the case in the Patent Office.

Signed and sealed this 4th day of February, A. D. 1941.

(Seal)

Henry Van Arsdale,
Acting Commissioner of Patents.